United States Patent [19]

Bikson et al.

[11] Patent Number: 4,767,422
[45] Date of Patent: Aug. 30, 1988

[54] COMPOSITE SEPARATION MEMBRANES AND THE PREPARATION AND USE THEREOF

[75] Inventors: Benjamin Bikson, Brookline; Salvatore Giglia, Norwood; Gregory Kharas, Chelmsford, all of Mass.

[73] Assignee: Union Carbide Corporation, Danbury, Conn.

[21] Appl. No.: 35,783

[22] Filed: Apr. 8, 1987

[51] Int. Cl.$^4$ .............................................. B01D 53/22
[52] U.S. Cl. .......................................... 55/16; 55/68; 55/158
[58] Field of Search ...................... 55/16, 68, 158, 209

[56] References Cited

U.S. PATENT DOCUMENTS

| | | | |
|---|---|---|---|
| 3,808,303 | 4/1974 | Ganci et al. | 264/41 |
| 3,852,388 | 12/1974 | Kimura | 55/16 X |
| 3,980,456 | 7/1976 | Browall | 55/158 |
| 4,080,743 | 3/1978 | Manos | 55/16 X |
| 4,120,098 | 10/1978 | Manos | 55/16 X |
| 4,207,192 | 6/1980 | Coplan et al. | 55/158 X |
| 4,230,463 | 10/1980 | Henis et al. | 55/16 |
| 4,243,701 | 1/1981 | Riley et al. | 55/158 X |
| 4,430,807 | 2/1984 | Davis et al. | 55/16 X |
| 4,472,175 | 9/1984 | Malon et al. | 55/16 |
| 4,486,202 | 12/1984 | Malon et al. | 55/158 |
| 4,527,999 | 7/1985 | Lee | 55/16 |
| 4,575,385 | 3/1986 | Brooks et al. | 55/158 |
| 4,606,740 | 8/1986 | Kulprathipanja | 55/158 X |
| 4,654,055 | 3/1987 | Malon et al. | 55/16 X |
| 4,664,681 | 5/1987 | Anazawa et al. | 55/16 X |

FOREIGN PATENT DOCUMENTS 0141793  5/1985  European Pat. Off. .

*Primary Examiner*—Robert Spitzer
*Attorney, Agent, or Firm*—Alvin H. Fritschler

[57] ABSTRACT

Composite membranes are post-treated by contact with a volatile solvent, with or without minute amounts of additives, followed by solvent evaporation, to repair defects in the thin separation layer thereof.

28 Claims, No Drawings

COMPOSITE SEPARATION MEMBRANES AND THE PREPARATION AND USE THEREOF

BACKGROUND OF THE INVENTION

1. Field of the Invention

This invention relates to semi permeable membranes for the separation of fluid mixtures. More particularly, it relates to the enhancing of the separation characteristics of composite membranes.

2. Description of the Prior Art

Semi-permeable membranes capable of selectively permeating one component of a fluid mixture, either liquid or gas, are considered in the art as a convenient, potentially highly advantageous means for achieving desirable fluid separations. Such membranes, for practical commercial application, must be capable of achieving an acceptable selectivity of separation of the gases or liquids contained in a feed gas mixture while, at the same time, achieving a desirably high flux, or permeability, of the fluid component being selectively permeated through the membranes.

Semi-permeable membranes have been extensively used in reverse osmosis or ultrafiltration processes, as in the desalination of water. In the reverse osmosis process, high pressure saline water is placed in contact with a semi-permeable membrane that is permeable to water, but relatively impermeable to salt. Concentrated brine and relatively pure water are separated thereby.

Semi-permeable membranes are also utilized in separation processes that involve a phase change of one or more components of the mixture to be separated. Thus, the feed and the permeate streams are alternately in the liquid and gaseous state, with gas being present on one side of the membrane. An example of such a process is pervaporation through membranes, which is particularly useful in the separation of liquids from their azeotrope solvent mixtures, and wherein liquid is present on the feed side of the membrane. Another such process is perstruction, wherein liquid is present on the permeate side of the membrane.

More recently, semi-permeable membranes have found broad utilization with respect to a variety of gas separation applications. Examples of such applications include air separation, the recovery of hydrogen from ammonia purge gas and from refinery gas streams, and carbon dioxide and methane separations in various operations such as tertiary oil recovery.

Semi-permeable membranes of a variety of materials and forms have been proposed in the art for the carrying out of such separations. So called composite membranes have been proposed wherein a thin layer of a suitable semi-permeable membrane material is superimposed on a relatively porous substrate. The separation layer is advantageously very thin in order to provide the desirably high flux referred to above. The substrate provides support for the delicate, very thin permeable membrane layer or coating superimposed thereon. Such composite membrane structures are described in the Klass et al. U.S. Pat. No. 3,616,607.

It will be appreciated that membranes for such separation processes, both liquid and gas, require membranes possessing a high degree of perfection in the membrane, or separation, layer. In gas separation processes, pervaporation, perstruction and the like, the best results would obviously be obtained if the membrane layer were free of any residual pores or other imperfections. On the other hand, the membrane layer needs to be made as thin as possible in order to attain desirably high permeation rates, and thus high overall separation process productivity. In such circumstances, the presence of morphological imperfections are frequently found to occur in the thin separation layer of membrane assemblies in the form of residual pores, minute pinholes and the like. Such imperfections can be introduced into the membrane system in the course of the various typical membrane manufacturing steps, such as spinning, casting, coating, curing and membrane module manufacturing operations.

In the field of reverse osmosis desalination processes, it is customary to treat membranes that exhibit subperformance separation characteristics, or membrane modules that have deteriorated during use in desalination operations in the field, with supplementary treating solutions. Such treatments are typically carried out from water solutions and result in the deposition of small amounts of materials dissolved in such solutions onto the exterior surface, and into the exterior pores, of the reverse osmosis membrane. Such treatments, described in the Ganci et al. U.S. Pat. No. 3,808,303, and in various other references, apparently result in modification of the surface characteristics and pore sizes of reverse osmosis membranes, with subsequent increase in membrane separation performance.

To overcome the problem of defects in the field of gas separation membrane manufacturing, the Browall U.S. Pat. No. 3,980,456, has disclosed the application of a second, sealing coating over the very thin membrane to cover defects caused by particulate impurities. Such treated composite structures are complex in nature and, moreover, the use of a superimposed very thin membrane on a porous support substrate has not generally provided the desired selectivity of separation without an unacceptable reduction in the flux, or permeability, of the permeate gas.

The problem of membrane defects has been experienced not only with respect to composite membranes, but also with respect to asymmetric type membranes. Such asymmetric membranes are distinguished by the existence of two distinct morphological regions within the membrane structure. One such region comprises a thin, dense, semi-permeable skin capable of selectively permeating one component of a gas mixture. The other region comprises a less dense, porous, non-selective support region that serves to preclude the collapse of the thin skin region of the membrane under pressure. Such asymmetric membranes are described in the Loeb et al. U.S. Pat. No. 3,133,132. As in the case of the composite membranes described above, such asymmetric membranes, when applied in gas separation operations, are frequently not sufficiently perfect for such purposes, and contain imperfections. A significantly reduced amount of gas separation will occur as a result of the presence of such defects in the asymmetric membrane structure. The Henis et al. U.S. Pat. No. 4,230,463, discloses a proposed solution to the problem caused by such defects. In the approach of Henis et al., the asymmetric membrane having limited amounts of residual surface porosity, usually less than $10^{-6}$ of the total surface area, is coated to cure defects therein. The coating material employed has a determined intrinsic separation factor that is less than that of the material of the asymmetric membrane. The resulting multi component membrane exhibits a separation factor significantly greater than the determined intrinsic separation factor of the material of the coating and greater than the separation factor exhibited by the uncoated asymmetric membrane.

In the Ward U.S. Pat. No. 4,214,020, a process is disclosed that teaches coating the exterior surface of a hollow fiber membrane assembly by immersing a bundle of hollow fibers into a coating solution, and driving the coating solution into the fiber by applying pressure from the exterior to the interior of the hollow fibers. This process, leading to the formation of a continuous layer/coating on the exterior of the hollow fibers, is particularly useful in the preparation of highly selective gas separation membranes by the coating of asymmetric membranes having some residual porosity with coating solutions of materials highly permeable to gases, as described in the Henis et al. patent referred to above.

Another treatment procedure to improve the separation characteristics of asymmetric membranes having residual porosity is disclosed in the Lee U.S. Pat. No. 4,527,999. This procedure relates to the treating of asymmetric cellulose acetate membranes under conditions that lead to differential collapse of surface pores, resulting in greatly improved membrane separation characteristics.

While improvements have thus been made with respect to the repairing of membrane defects, the presence of such defects remains a problem, and this problem is aggravated by the increasing requirements for extremely thin external membrane separation layers in order to achieve high permeate flux. The providing of very thin membrane separation layers can frequently, in turn, lead to a decrease in the separation factor of the membrane due to the increased presence of imperfections therein, and to the collapse of the separation layer under high operating pressure conditions. A need remains, therefore, for further improvements in the art with respect to eliminating or minimizing the problem of membrane defects. In particular, it is desired that the repairing of defects be carried out so as to enable higher selectivity characteristics to be achieved without adverse affect on the permeability characteristics of the membrane, so that advantageous combinations of selectivity and permeability can be achieved in practical fluid separation operations.

The need for further improvements in the repairing of defects is particularly pertinent with respect to composite membranes. Conventional composite membranes, in which the coating provides the separation characteristics of the composite membrane structure, have an inherent flexibility of application not possessed by other forms of membrane structure. The separation layer can thus be selected particularly for a desired separation application, while the hollow fiber or other desired form of substrate provides a relatively porous, non selective support for the separation layer. As the advantages of composite membranes become increasingly appreciated with regard to a variety of gas and liquid separation operations, the desire in the art for the development of various composites for particular applications will like increase. Such development, as indicated above, involves desirable separation characteristics combined with high flux, or advantageous combinations of separation and permeability consistent with the overall performance requirements of particular applications. The providing of a convenient, effective and generally applicable means for repairing minute defects in the separation layer of such composites becomes ever more important as the applications for composites increase and as the separation layers become thinner to more fully realize the overall separation-permeability requirements pertaining to the use of composite membranes in a variety of practical, commercial gas or liquid separation applications.

It is an object of the invention, therefore, to provide a convenient, generally applicable process for the plugging of the minute defects in the thin separation layers of composite membranes.

It is another object of the invention to provide improved composite membranes capable of approaching the intrinsic separation characteristics of the coating material without any significant loss in the permeability characteristics of the separation layer.

It is a further object of the invention to provide composite membranes having an advantageous combination of selectivity and permeability for use in particular gas, pervaporation or perstruction separation operations.

With these and other objects in mind, the invention is hereinafter described in detail, the novel features thereof being particularly pointed out in the appended claims.

SUMMARY OF THE INVENTION

Composite membranes are post-treated so as to plug defects in the thin separation layer thereof by contacting said membrane with an essentially pure volatile solvent, with or without the addition of minute amounts of additives, and then drying said membrane until the volatile solvent is essentially completely removed. The post-treating solution can be applied to the permeate side or to the feed side of the composite membrane. Defects in the composite membrane can be plugged by such post-treatment so that the membrane can essentially completely recover the intrinsic separation characteristics of the separation layer without appreciable or undue loss in the permeation characteristics of the composite membrane. When used for particular gas or liquid mixture separations, the post-treated composites are capable of achieving enhanced combinations of selectivity and permeability with respect to the feed mixture components desired to be separated.

DETAILED DESCRIPTION OF THE INVENTION

The objects of the invention are accomplished by the post-treatment of composite membranes in the manner described and claimed herein, the post-treatment process being convenient, effective and generally applicable to a wide variety of separation layers susceptible to defects and to a wide variety of composite membrane compositions adapted to the particular selectivity-permeability requirements of various gas or liquid separation operations. The performance capabilities of composite membranes can thus be readily achieved, and the process of the invention can be practiced in preferred embodiments so as to ensure consistency and reproducibility of results regardless of variations in the extent to which defects are found to occur in the thin separation layer of composite membranes.

It has been found, surprisingly, that defects in the dense separation layer thereof can be conveniently and effectively plugged by post-treatment with a volatile post-treatment solution as described below. Such treatment leads essentially to the restoration of the intrinsic membrane separation capabilities of the membrane without any undue loss in the permeation characteristics of the composite membrane. By the post-treatment process of the invention, therefore, composite membranes and their membrane assemblies, can be employed so as to fully utilize the separation capabilities of the particular separation layer material used in the composite and to achieve an advantageous combination of selectivity and permeability.

The process of the invention comprises bringing the volatile post-treatment solution into contact with the separation layer of the composite membrane, and subsequently drying the treated membrane so as to essentially completely evaporate and remove said treatment solution from the membrane. The volatile post-treatment solution can comprise an essentially pure volatile solvent. Those skilled in the art will appreciate that such essentially pure volatile solvent will nevertheless, when used in the practice of the invention, contain minute amounts of non-volatile additives as, for example, through leaching of oligomers plasticizers or other ingredients from the materials of membrane construction themselves upon contacting the membrane for purposes of the invention. In this regard, it should be noted that composite membranes that contain residual defects, as referred to herein, and that are treated as herein provided, exhibit substantial initial separation factors that are indicative of very small amounts of minute imperfections in the separation layer. The residual pores of the separation layer are of the angstrom size range and appear to be no larger than several tens of angstroms at most. The amount of such residual pores is also very small so that the surface porosity of the separation layer, i.e. the ratio of the surface occupied by pores to the total surface area of said separation layer, is generally less than about $10^{-7}$. The mechanism by which such imperfections, or defects, are effectively blocked is not entirely clear, but it appears that the imperfections are blocked by the minute amounts of non-volatile additives in the ppm concentration range that are present in the volatile solvent system. Such imperfections in the separation layer, upon being plugged as provided herein, do not provide a continuous conduit path that would otherwise connect the feed and permeate sides of the composite membrane and result in a decrease in membrane selectivity when the imperfections of the separation layer are superimposed on the pores of the porous substrate layer.

The volatile solvent system used in the practice of the invention is desirably selected to have essentially non solvent characteristics, or mild swelling characteristics, towards the materials of membrane construction so as to prevent densification of the porous structure or distortion of the membrane body. A term that is used frequently to define the solubility of polymers and solvents is the "solubility parameter", which is defined as the square root of the cohesive energy density of the material. For the post-treatment solvent system to be of a non-solvent or mild swelling character with respect to the various materials of membrane construction, the solubility parameter of the post-treatment solvent system should be at least about 1.5 units higher or lower than the solubility parameter of a specific material of membrane construction used in the membrane being treated. Cyclohexane, isopropyl alcohol and water are typical volatile solvents suitable for use in various embodiments of the invention.

Although an essentially pure volatile solvent can be effectively used in the practice of the invention, it is found generally desirable to incorporate minute amounts of non-volatile additives into the solvent to assure enhanced consistency and reproducibility of results. In a preferred embodiment of the invention, the post-treatment solution comprises a very dilute polymer solution. For purposes of this invention the dissolved polymer can have either a higher or a lower selectively than that of the separation layer being treated. It should be noted that polymeric materials of high selectivity typically have low permeation rate characteristics, particularly in gas separation applications. Polymeric materials of low selectivity, on the other hand, typically exhibit high permeabilities. When high selectivity polymers, such as polyacrylic acid, sulfonated polysulfone, polyvinylpyridine, or polyvinyl alcohol, are employed, the minute polymer concentration will typically be in the range of from about 0.001% (10 ppm) by weight of solution to about 0.1%. When lower selectivity, higher permeability rate polymers such as polysiloxane or ethyl cellulose, are employed, the typical range of polymer concentration extends to higher concentrations, i.e. from about 0.001% to about 1%.

It will be further appreciated that the minute amount of additives incorporated with the volatile solvent post-treatment solution to assure enhanced consistency and reproductivity of results can be varied widely within the scope of the invention. Further illustrative polymers that can conveniently be employed in small amounts in the volatile solvent system are polyacrylates, polyethylene oxide, polyvinylpyrrolidone, polyvinylpyridine, polyethylene amine and sulfonated polyarylates.

It is also within the scope of the invention to employ minute amounts of other types of additive materials in the post-treatment solution, in amounts generally within the concentration ranges indicated above. Illustrative examples of such additives include non-volatile liquids, which have been found to effectively block membrane imperfections upon evaporation of the volatile solvent, suspended colloidal particles, and dissolved low molecular weight materials, such as plasticizers, antiplasticizers, dyes and salts. Illustrative examples of such materials include low molecular weight polyhydric alcohols, such as glycerine, ethylene glycol or pentaerytritol, and dyes, such as Rhodamine B. It is also within the scope of the invention to employ post-treatment solutions containing a combination of additive materials, such as those described above, to enhance membrane separation performance in particular applications. In addition, the post-treatment process of the invention can also be carried out in a number of separate, successive treatment steps. Such separate steps can employ the same or different additives, or can comprise a combination of steps in which additive(s) are employed and steps in which additive(s) are not employed.

When the composite membrane assembly is to be utilized in a separation process that involves the presence of a liquid stream on either the feed or the permeate side of the membrane, as in pervaporation or perstruction, a further requirement is necessarily imposed on the nature of any additives employed in the volatile post-treatment solution. That is, the additives should not be soluble in such liquid streams so as to be removed from the separation layer imperfections.

In alternative embodiments of the invention, the post-treatment process can be carried out by contacting the separation layer of the composite membrane with a post-treatment solution that contains high concentrations of additives, and then washing the thus treated membrane with a volatile solvent prior to drying. Even pure additive itself can be employed if the additive is a non-volatile liquid. The washing step is essential in such embodiments since the beneficial results of attaining intrinsic membrane separation characteristics without undue loss in permeation rates are generally achieved only if the membrane surfaces, prior to the drying step, are exposed to a volatile solvent only, or to a volatile solvent that contains only minute amounts of additives.

It should be noted that the separation layer of the composite membrane can be treated from the surface side to be exposed to the feed fluid separation stream, e.g. the membrane feed side, or, alternatively, from the membrane permeate side. In one embodiment, the separation layer is post-treated from the feed side by bringing the entire membrane surface into contact with the post-treatment solution. To assure that the entire membrane surface is in contact with said solution, it is generally beneficial to impose a pressure differential from the feed to the permeate side of the membrane. The pressure employed should not, of course, exceed the membrane compaction yield point of the membrane structure being treated.

In other embodiments, the membrane assemblies are effectively treated from the membrane permeate side. To assure a consistently successful treatment of the membrane assemblies when the approach is employed, it is beneficial to introduce the post-treatment solution into the permeate side of the membrane or membrane module under conditions of pressure differential between said permeate side and the feed side of the membrane. All defective areas in the separation layer are thus brought into contact with the post-treatment solution upon passage thereof through the porous support structure on the permeate side of the membrane. The pressure differential employed should be selected so as to avoid exceeding the point of irreversible membrane deformation or the burst strength of the membrane. The desired pressure differential can be conveniently established by applying a vacuum to the feed side of the membrane, or by applying pressure to the permeate side while the feed side is kept at atmospheric pressure, or by a combination of such approaches. It has been found that the carrying out of the post-treatment process of the separation layer from the permeate side only results in particularly effective plugging of the residual pores and other imperfections in said layer without densification of additional parts of the separation layer or of the porous support. In addition, this approach also results in effective plugging of imperfections without a substantial deposition of foreign materials in the porous substrate and without further deposition of an additional and substantial layer beneath the separation layer. The desired increase in separation can thereby be achieved with minimal loss in productivity.

The post-treatment process of the invention can be applied to composite membranes prior to or after being incorporated into membrane assemblies. Treatment prior to incorporation of the membranes into assemblies is generally less desirable than post-treating the constructed membrane assemblies, however, due to the fact that some additional imperfections can be introduced into the separation layer during the construction of the membrane assembly. For this reason, the post-treatment process is typically carried out in an assembled membrane separating device. The membrane device is designed to carry out a selective separation of at least one component from a fluid stream mixture. The membrane apparatus will typically consist of an enclosure and a membrane assembly positioned therein. The membrane assembly can be constructed in the form of a spiral wound cartridge, a hollow fiber bundle, a pleated flat sheet membrane assembly, and like assemblies common in the membrane industry. The membrane assembly is constructed so as to have a feed-surface side and an opposite permeate exit side. The enclosure is constructed so as to enable the feed stream mixture to be brought into contact with the membrane feed-surface side. Conduit means are provided for the removal of the part of the feed stream that did not permeate through the membrane, and for the separate removal of the permeate gas that has passed through the membrane. The post-treatment operation of the invention can be carried out directly within the enclosure described above, with the membrane assembly in place therein, or alternatively, in a separate enclosure that is only used for the treatment of membrane assemblies.

Those skilled in the art will appreciate that the volatile solvent or post-treatment solution preferred for use in the practice of particular embodiments of the invention will depend upon the particular composite membrane being treated, and the operating conditions and desired performance capabilities of any given fluid separation operation. Volatile hydrocarbons, alcohols, water and fluorocarbons are among the generally preferred solvent materials for use in the practice of the invention. Solvents that are compatible with the membrane material and have boiling points in the range of from about 20° C. to about 100° C. are generally preferred for use in the practice of the invention. If higher boiling materials are employed, the requirements for higher temperature and/or vacuum operation or the like are such as to add to the overall expense of the post-treatment process. Solvents capable of readily evaporating under ambient conditions are, of course, particularly preferred for purposes of the invention.

As indicated above, the plugging of minute imperfections in the separation layer of the composite membrane may be due to the deposition of minute amounts of additives from the post-treatment solvent system, as a result of their adsorption and occlusion into the imperfections of the separation layer. Regardless of the process mechanism, however, the post-treatment process of the invention has been found to result in the deposition of plugging material preferentially and essentially in the imperfections of the separation layer only. This highly desirable effect results, in some instances, in only a minimal decrease, or no decrease at all, in the permeation rates of composite membranes following post-treatment in accordance with the invention. In turn, this allows the use of materials having very low permeability, or practically impervious materials, as additives in post-treatment solvent systems. Thus, the selectivity of the separation layer can be increased to the intrinsic values of the separation layer material without undue loss in membrane permeability rates.

The invention is hereinafter further described with respect to various illustrative examples of the practice thereof. It should be understood, however, that such examples should not be construed as limiting the scope of the invention as set forth in the appended claims.

EXAMPLE 1

A composite hollow fiber membrane was prepared by coating polysulfone hollow fibers with cellulose acetate. The polysulfone hollow fibers were spun from a polysulfone dope solution, quenched and washed in accordance with conventional techniques. As discussed by Cabasso et al. in "Composite Hollow Fiber Membranes", Journal of Applied Polymer Science, Vol. 23, p.p. 1509-1525 (1979), polysulfone hollow fibers can be spun from a ternary solution of polysulfone, poly(vinylpyrrolidone) and dimethylacetamide, with a total polymeric concentration in the solution desirably being 40-52 wt. %, and the polysulfone/poly(vinylpyrrolidone) ratio being 1.5-2.0. The well known tube-in-tube jet technique is convenient for the spinning procedure, with water at about 21° C. being the preferred outside quench for the fibers. The quench medium in the center of the fiber is desirably air. The washed fibers were dried and were coated with cellulose acetate in a coating, drying and curing sequence. For this purpose, the dried hollow fibers were passed through the coating solution contained in a coating vessel and were then passed through a dryer oven and cure oven for contact with drying air and higher temperature curing air prior to being taken up on a winder. The coating, drying and curing sequence is further described in the Coplan et al. U.S. Pat. No. 4,467,001. A hollow fiber separatory module was constructed utilizing an annulus of said hollow fibers with the open ends thereof encased in a potting compound and a collection chamber communicating with said open ends adjacent said potting compound. Further details relating to said separatory module are contained in the Coplan et al. U.S. Pat. No. 4,207,192. When tested for the separation of a helium/nitrogen mixed gas stream containing 10% helium at 100 psig, the helium permeability was found to be 0.31 $ft^3/ft^2$·psi·day, and the selectivity between helium and nitrogen was found to be 52. As used herein, it will be appreciated that the selectivity, or separation factor, of a membrane or membrane module represents the ratio of the permeate rate of the more permeable to the less permeable component of a mixture being separated. The module was post-treated using cyclohexane, Aldrich Chemicals ACS reagent grade, as the volatile solvent. No additive was employed in this embodiment. The feed gas shell side of the module was filled with said cyclohexane, and the wetted membrane was kept in contact with the cyclohexane for 15 minutes. The solvent was then drained from the module, and the thus post-treated module was dried by placing the entire module under a vacuum of 28 inches of Hg for 24 hours at 30° C. The permeation rate of helium for the post-treated module was found to be a desirable 0.22 $ft^3/ft^2$·psi·day, with the selectivity between said helium and nitrogen gases being increased to 70.

EXAMPLE 2

A hollow fiber separating module was prepared as in Example 1 above, using ethyl cellulose as the separation layer coated on polysulfone hollow fibers. The module was tested for air separation at 100 psig and 5% stage cut, e.g. vol. permeate/vol. feed. The preferential oxygen permeation rate was found to be 0.21 $ft^3/ft^2$·psi·day, and the separation factor between oxygen and nitrogen was 3.5. The module was post-treated with a 5% by weight solution of glycerine, Fisher Scientific certified ACS grade, in water. The post-treatment solution was placed in contact with the open ends of the hollow fibers on the permeate side of the module, and the solution was further induced into the hollow fiber bores and the porous support structure of the membrane by applying a vacuum of 28 inches of Hg to the feed side of the membrane for 30 minutes. The thus post-treated module was dried by placing the entire module under a vacuum of 28 inches of Hg for 24 hours at 30° C. The post-treated module was tested for air separation and was found to exhibit an advantageous increase in the separation factor to 3.7, with no decrease in the oxygen permeation rate.

EXAMPLE 3

A hollow-filament separatory module was constructed as in Example 1 above, using cellulose acetate as the separation layer coated on polysulfone hollow fibers. The module was tested for gas permeation characteristics using pure gas streams of helium and nitrogen at 100 psig. The gas permeation rate for helium was found to be 0.58 $ft^3/ft^2$·psi·day, and the separation factor between helium and nitrogen gases was 63. The module was post-treated with a solution of cross-linkable polysiloxane Sylgard 184, Dow Corning Co., 0.05% by weight in cyclohexane by completely filling the feed side of the module with the treating solution and subjecting said feed side of the module to a pressure of 600 psig for 30 minutes. The post-treatment solution was then drained, and the entire module was placed under a vacuum of 28 inches of Hg and dried at 30° C. for 48 hours. The thus post-treated module was retested with pure gas streams of helium and nitrogen. The permeation rate for helium was found to be 0.51 $ft^3/ft^2$·psi·day. The separation factor was 104 between helium and nitrogen gases. Similar post-treatment of the module with a 0.01% by weight solution of polyacrylic acid (MW=50,000) in water likewise enabled the separation factor to be improved with only a slight reduction in permeability.

EXAMPLE 4

The post-treatment process of Example 3 was similarly applied to a cellulose acetate hollow fiber composite, except that a 0.01% by weight solution of polyacrylic acid (MW=50,000) in water was used as the post-treatment solution. Said polyacrylic acid is representative of materials with high separation, low permeability characteristics. The separation factor for helium-nitrogen separation was improved from 31 to 88 as a result of the treatment, with essentially no reduction in permeation rate.

EXAMPLE 5

A separatory module of composite cellulose acetate on polysulfone hollow fibers was constructed, as in Example 1 above, and post-treated from the module feed side with a solution of cross-linkable polysiloxane, as described in Example 3 above, except that the pressure differential was not applied from the feed to the permeate side of the membrane during the treatment process. The helium/nitrogen separation factor increased from 18 in the original module to 62 in the post-treated one, while the helium permeation rate decreased somewhat from 0.8 to 0.6 $ft^3/ft^2$·psi as a result of the post-treatment.

EXAMPLE 6

A separatory module comprised of cellulose acetate hollow fibers prepared as in Example 1 above were post-treated as in Example 3 above, except that the post-treating solution was comprised of 0.5% by weight of dimethyl-phenylsiloxane copolymer (80-85% dimethyl, 8-12% phenyl, M.W. 30,000, Petrarch Systems, Inc.) in cyclohexane. The helium/nitrogen gas separation factor of the module improved remarkably from 11 to 109 as a result of the post-treatment process, with the helium permeation rate being 0.50 as compared to 0.73 ft$^3$/ft$^2$·psi·day prior to said post-treatment.

EXAMPLE 7

A hollow fiber separatory module was constructed as in Example 1 above and comprised a composite of ethyl cellulose coated on polysulfone hollow fibers. When tested for air separation at 100 psig, the module exhibited an oxygen/nitrogen separation factor of 3.4, and an oxygen permeation rate of 0.2 ft$^3$/ft$^2$·psi·day. The hollow fiber module was placed in contact with a 5% by weight solution of glycerin in water from the module feed side. The post-treatment solution was drained from the module after 0.5 hours, and the module was dried in air at 60° C. The oxygen/nitrogen gas separation factor for the post-treated module was found to be 3.9 with essentially no change in the permeation rate of oxygen.

EXAMPLE 8

A hollow fiber separation module comprised of a composite of cellulose acetate on polysulfone hollow fibers was constructed as in Example 1 above. The module was tested for gas permeation characteristics with pure gas streams of helium and nitrogen at 100 psig. The gas permeation rate for helium was found to be 1.8 ft$^3$/ft$^2$·psi·day. The separation factor between helium and nitrogen gases was found to be 9. The module was post-treated with a solution comprised of 1% by weight of Rhodamine B dye (Aldrich Chemical Co.) in water. The treatment procedure consisted of completely filling the feed side of the membrane assembly with the treating solution and applying a pressure of 800 psig for 30 minutes to the feed side of the module. The module was then drained of the treating solution, and the feed side thereof was flushed with ultra-pure water for several minutes. The module was then dried and retested to find that the helium permeation rate was 1.5 ft$^3$/ft$^2$·psi·day and that the helium/nitrogen separation factor was 50.

The illustrative examples will be seen to show that the invention can be used to improve the gas separation factors of composite membranes by the post-treatment process disclosed herein, using a volatile solvent or a volatile solvent system containing small amounts of additives, without a substantial or undue reduction, or in some instances any reduction, in gas permeate rates.

Those skilled in the art will appreciate that various changes or modifications can be made in the details of the post-treatment process as herein described without departing from the scope of the invention as recited in the appended claims. It could also be appreciated that the process of the invention can be employed to plug the imperfections in the separation layer of any suitable composite membrane composition desired for use in any practical commercial gas, pervaporation or prestructure separations. The membrane material used as the separation layer and the porous substrate material used as the support layer of the composite membranes of the invention can be any suitable materials, polymeric or non polymeric, in nature. The composite membrane treated as herein provided can also comprise a multi layered composite structure, and the membrane may possess enzymatic or other catalytic sites incorporated herein, and the membrane may comprise an active transport membrane.

In all such embodiments, the separation layer will be selected for its desired selectivity with respect to the fluid mixture desired to be separated, and the separation layer-substrate structure will be selected for its overall convenience and combination of permeability characteristics as pertains to any given separation. Illustrative of the polymeric materials that can advantageously be employed in the separation layers of composite membranes treated as herein provided are derivatives of cellulose, e.g. ethyl cellulose and cellulose acetate; polyarylates, e.g. polyphylene oxide; and polyacrylates, e.g. polymethylmethacrylate. While a variety of known materials, such as cellulose acetate, polyphenylene oxide, etc., can be used for the porous support layer of the composite membranes, the use of polysulfone is the generally preferred material for use in the production of the composite membranes of the invention.

As indicated above, the invention can be advantageously employed in a wide variety of practical commercial operations, such as air separation, the recovery of hydrogen from ammonia purge gas and from refinery streams, carbon dioxide and methane separations in a variety of operations, helium and nitrogen separations, alcohol and water separations wherein the permeate is a gas comprising water, and the like. It will also be appreciated that the separation layer treated in accordance with the invention will generally comprise a very thin coating of membrane material. In general, the separation layer will be about 0.4 microns or less in thickness, with thicknesses in the range of about 0.02 to about 0.2 microns being typically preferred.

In all of the various embodiments of the invention, separation layers are selected to determine the separation characteristics of composite membranes. The invention enables imperfections in the operation layer to be effectively and selectively plugged in a convenient and desirable manner. In the overcoming of a major problem confronted in the production of membranes having very thin separation layers, the invention will be seen to contribute to the ever increasing use of composite membranes in a wide variety of commercial significant fluid separation operations.

We claim:

1. A process for repairing a composite membrane suitable for gas, pervaporation or prestructure separations comprising a separation layer that determines the separation characteristics of the membrane and a porous support layer, said separation layer containing imperfections therein, said process consisting essentially of:
    (a) contacting said separation layer with a volatile post-treatment solution system comprising a volatile solvent having essentially non-solvent or mild swelling characteristics with respect to the composite membrane materials, said solvent containing minute amounts of non-volatile additives as it contacts and fills said imperfections; and
    (b) evaporating said volatile solvent from the composite membrane, said minute amounts of additives remaining in and serving to plug preferentially and essentially said imperfections only, whereby the post-treatment process serves to effectively repair the separation layer of the composite membrane, enhancing the selectivity thereof and enabling advantageous combinations of selectivity and permeability to be achieved by the use thereof.

2. The process of claim 1 in which the volatile solution system is contacted with the separation layer of the composite membrane that is incorporated into a separatory module.

3. The process of claim 2 in which said volatile solution system is brought into contact with the permeate side of the separatory module and including applying a differential pressure from the permeate to the feed side of the separatory module.

4. The process of claim 3 in which the pressure differential is applied by the drawing of a vacuum on the feed side of the separatory module.

5. The process of claim 2 in which said volatile solution system is brought into contact with the feed side of the separatory module and including applying a differential pressure from the feed side to the permeate side of the separator module.

6. The process of claim 5 in which the pressure differential is applied by the drawing of a vacuum on the permeate side of the separatory module.

7. The process of claim 1 in which the volatile solvent is evaporated from one side of the composite membrane only.

8. The process of claim 1 in which the composite membrane is in hollow fiber form.

9. The process of claim 8 in which the separation layer of the composite membrane comprises a polymeric material.

10. The process of claim 8 in which said support layer comprises polysulfone.

11. The process of claim 1 in which said volatile solution system consists essentially of volatile solvent only, the solvent containing minute amounts of additives through the leaching thereof from the materials of said composite membrane itself.

12. The process of claim 1 in which said volatile solution system used to contact the separation layer comprises a volatile solvent and a small amount of non-volatile additives incorporated therein.

13. The process of claim 12 in which said additives comprise dissolved polymer.

14. The process of claim 12 in which said additives comprise suspended colloidal particles.

15. The process of claim 12 in which said additives comprise dissolved low molecular weight, essentially non-volatile additives.

16. The process of claim 1 in which said combination of steps (a) and (b) are carried out consecutively more than once.

17. A post-treated composite membrane suitable for gas, pervaporation or prestructure separations comprising a separation layer that determines the separation characteristics of the membrane and a porous support layer, said separation layer containing imperfections that are plugged by minute amounts of additives, said composite membrane having been post-treated for the repair of said imperfections by a process consisting essentially of:
(a) contacting said separation layer with a volatile post-treatment solution system comprising a volatile solvent having essentially non solvent or mild swelling characteristics with respect to the composite membrane materials, said solvent containing minute amounts of non-volatile additives as it contacts and fills said imperfections; and
(b) evaporating said volatile solvent from the composite membrane, said minute amounts of additives remaining in and serving to plug preferentially and essentially said imperfections only, whereby the post-treatment process serves to repair the separation layer of the composite membrane, enhancing the selectivity thereof and enabling advantageous combinations of selectivity and permeability to be achieved by the use thereof.

18. The composite membrane of claim 17 in which the post-treatment process is carried out following incorporation of said composite membrane into a separatory module.

19. The composite membrane of claim 18 in which the composite membrane is in hollow fiber form.

20. The composite membrane of claim 19 in which the separation layer thereof comprises a polymeric material.

21. The composite membrane of claim 20 in which said volatile solution system has a solubility parameter of at least about 1.5 units higher or lower than that of the composite membrane materials.

22. An improved process for the separation of a more permeable component of a fluid feed mixture from a less permeable component thereof by gas, pervaporation or perstructure separations, including contacting said feed mixture with the feed side of a composite membrane suitable for gas, pervaporation or prestructure separation operations, and separately withdrawing said more permeable component as a permeate stream and said less permeable component as a non-permeate stream, said composite membrane having a separation layer that determines the separation characteristics of the membrane and a porous support layer, said composite membrane having been post-treated by a process consisting of:
(a) contacting said separation layer with a volatile post-treatment solution system comprising a volatile solvent having essentially non-solvent or mild swelling characteristics with respect to the composite membrane materials, said solvent containing minute amounts of non-volatile additives as it contacts and fills said imperfections; and
(b) evaporating said volatile solvent from the composite membrane, said minute amounts of additives remaining in and serving to plug preferentially and essentially said imperfections only, whereby the post-treatment process serves to repair the separation layer of the composite membrane, enhancing the selectivity thereof and enabling advantageous combinations of selectivity and permeability to be achieved in said separation process.

23. The process of claim 22 in which said post-treatment process is carried out following incorporation of said composite membrane into a separatory module.

24. The process of claim 22 in which the composite membrane is in hollow fiber form.

25. The process of claim 22 in which said feed mixture comprises a mixture of carbon dioxide and methane.

26. The process of claim 22 in which said feed mixture comprises ammonia purge gas and said permeate gas comprises hydrogen.

27. The process of claim 22 in which said feed mixture comprises air and said permeate gas comprises oxygen.

28. The process of claim 22 in which said feed mixture comprises a mixture of alcohol and water and the permeate is a gas comprising water.

* * * * *